United States Patent [19]

Nutter et al.

[11] 4,187,551

[45] * Feb. 5, 1980

[54] APPARATUS FOR WRITING DATA IN UNIQUE ORDER INTO AND RETRIEVING SAME FROM MEMORY

[75] Inventors: Geoffrey Nutter, Cheadle; William McGibbon, Manchester, both of England

[73] Assignee: Ferranti Limited, England

[*] Notice: The portion of the term of this patent subsequent to Sep. 5, 1994, has been disclaimed.

[21] Appl. No.: 853,461

[22] Filed: Nov. 21, 1977

Related U.S. Application Data

[63] Continuation-in-part of Ser. No. 742,230, Nov. 16, 1976, Pat. No. 4,112,487.

[30] Foreign Application Priority Data

Nov. 21, 1975 [GB] United Kingdom ............... 47988/75
Nov. 20, 1976 [GB] United Kingdom ............... 48514/76

[51] Int. Cl.² .............................................. G06F 7/00
[52] U.S. Cl. .................................................. 364/900
[58] Field of Search ... 364/200 MS File, 900 MS File

[56] References Cited

U.S. PATENT DOCUMENTS

| 3,351,917 | 11/1967 | Shimabukuro | 364/900 |
| 3,374,463 | 3/1968 | Muir | 364/900 |
| 3,704,452 | 11/1972 | Beausoleil et al. | 364/900 |
| 3,810,115 | 5/1974 | Stafford | 364/900 |
| 3,961,313 | 6/1976 | Bodner et al. | 364/200 |
| 3,996,566 | 12/1976 | Moran | 364/200 |

*Primary Examiner*—Raulfe B. Zache
*Attorney, Agent, or Firm*—Cameron, Kerkam, Sutton, Stowell & Stowell

[57] ABSTRACT

Data processing apparatus includes a storage circuit or memory, and an addressing circuit for identifying word locations within the storage circuit or memory into and from which a plurality of information items are to be written and read, respectively. A translating circuit is provided for successively shifting, in a write mode of operation, at least a portion of each information item so that it is stored in the storage circuit in a manner that the stored information item in each word location has a bit order different from that order of any other information item as stored in the storage circuit. In a read mode of operation, the translating or de-skewing circuit shifts the information items as read out from the storage circuit in a direction opposite to that imparted during the writing mode.

18 Claims, 18 Drawing Figures

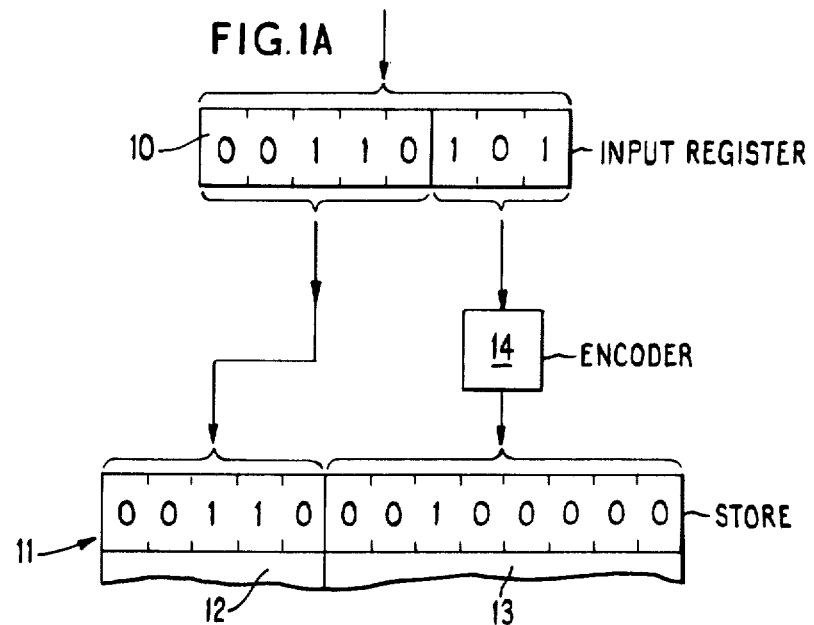

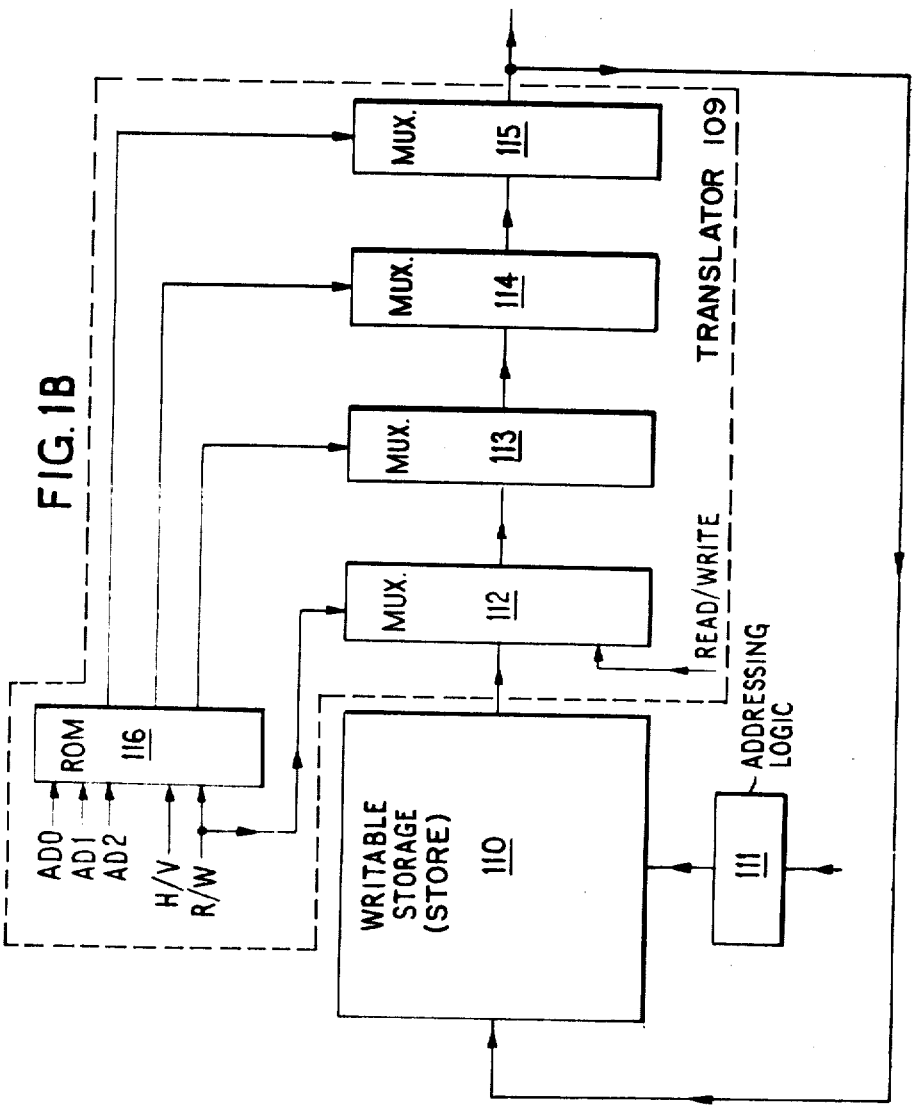

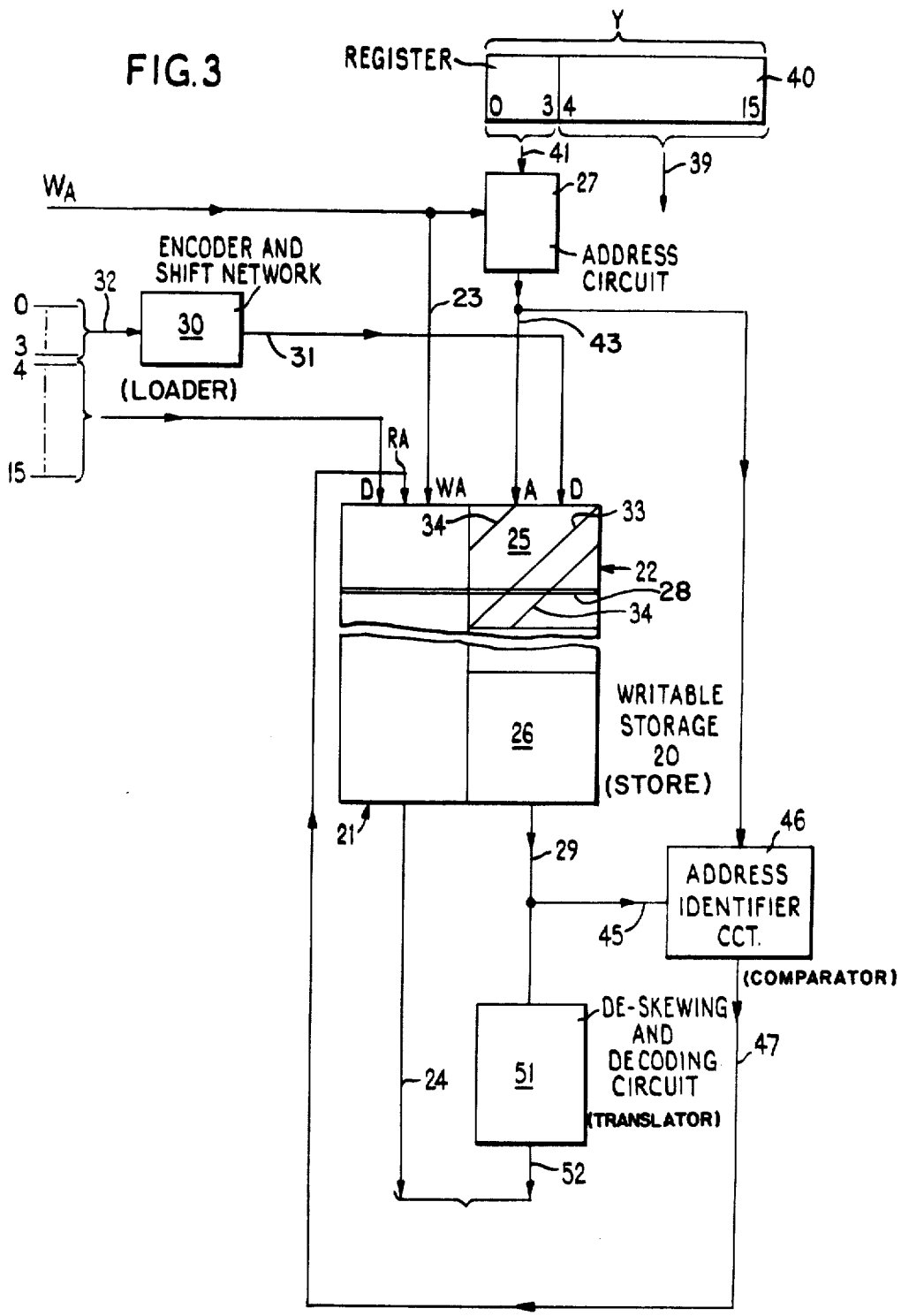

| | $B_{15}$ | $B_{14}$ | $B_{13}$ | $B_{12}$ | $B_{11}$ | $B_{10}$ | $B_9$ | $B_8$ | $B_7$ | $B_6$ | $B_5$ | $B_4$ | $B_3$ | $B_2$ | $B_1$ | $B_0$ |
|---|---|---|---|---|---|---|---|---|---|---|---|---|---|---|---|---|
| $T_0$ | 15 | 14 | 13 | 12 | 11 | 10 | 9 | 8 | 7 | 6 | 5 | 4 | 3 | 2 | 1 | 0 |
| $T_1$ | 14 | 13 | 12 | 15 | 10 | 9 | 8 | 11 | 6 | 5 | 4 | 7 | 2 | 1 | 0 | 3 |
| $T_2$ | 13 | 12 | 15 | 14 | 9 | 8 | 11 | 10 | 5 | 4 | 7 | 6 | 1 | 0 | 3 | 2 |
| $T_3$ | 12 | 15 | 14 | 13 | 8 | 11 | 10 | 9 | 4 | 7 | 6 | 5 | 0 | 3 | 2 | 1 |
| $T_4$ | 11 | | | 8 | 7 | | | 4 | 3 | 2 | 1 | 0 | 15 | | | 12 |
| $T_5$ | | | 8 | | | 4 | | | 2 | 1 | 0 | 3 | | | 12 | |
| $T_6$ | | 8 | | | 4 | | | | 1 | 0 | 3 | 2 | | 12 | | |
| $T_7$ | 8 | | | 9 | 4 | | | 5 | 0 | 3 | 2 | 1 | 12 | | | 13 |
| $T_8$ | 7 | | | 4 | | 2 | | 0 | 15 | | | 12 | 11 | | | 8 |
| $T_9$ | | | 4 | | 2 | | 0 | | | | 12 | | | | 8 | |
| $T_{10}$ | | 4 | | | 0 | | 2 | | 12 | | | | 8 | | | |
| $T_{11}$ | 4 | | | 5 | 0 | | 2 | | 12 | | | 13 | 8 | | | |
| $T_{12}$ | | 2 | | 0 | 15 | | | 12 | 11 | | | 8 | 7 | | | 4 |
| $T_{13}$ | | | 0 | | | 12 | | | | 8 | | | | 4 | | |
| $T_{14}$ | | 0 | | 2 | | 12 | | | 8 | | | | 4 | | | |
| $T_{15}$ | 0 | | 2 | | 12 | | 13 | 8 | | | 9 | 4 | | | | 5 |

| T₁ | T₀ | D₁ | D₀ | O/P | | |
|---|---|---|---|---|---|---|
| 0 | 0 | 0 | 0 | 0 | 0 | 0 |
| 0 | 0 | 0 | 1 | 0 | 1 | 1 |
| 0 | 0 | 1 | 0 | 1 | 0 | 2 |
| 0 | 0 | 1 | 1 | 1 | 1 | 3 |
| 0 | 1 | 0 | 0 | 0 | 1 | 1 |
| 0 | 1 | 0 | 1 | 1 | 0 | 2 |
| 0 | 1 | 1 | 0 | 1 | 1 | 3 |
| 0 | 1 | 1 | 1 | 0 | 0 | 0 |
| 1 | 0 | 0 | 0 | 1 | 0 | 2 |
| 1 | 0 | 0 | 1 | 1 | 1 | 3 |
| 1 | 0 | 1 | 0 | 0 | 0 | 0 |
| 1 | 0 | 1 | 1 | 0 | 1 | 1 |
| 1 | 1 | 0 | 0 | 1 | 1 | 3 |
| 1 | 1 | 0 | 1 | 0 | 0 | 0 |
| 1 | 1 | 1 | 0 | 0 | 1 | 1 |
| 1 | 1 | 1 | 1 | 1 | 0 | 2 |

| 0000,0010 | | | | | | |
|---|---|---|---|---|---|---|
| B8 | 1010 | = | T10 | B0 | 0010 | = | T2 |
| B9 | 1011 | = | T11 | B1 | 0011 | = | T3 |
| B10 | 1000 | = | T8 | B2 | 0000 | = | T0 |
| B11 | 1001 | = | T9 | B3 | 0001 | = | T1 |
| B12 | 1110 | = | T14 | B4 | 0110 | = | T6 |
| B13 | 1111 | = | T15 | B5 | 0111 | = | T7 |
| B14 | 1100 | = | T12 | B6 | 0100 | = | T4 |
| B15 | 1101 | = | T13 | B7 | 0101 | = | T5 |

| $Y_0, Y_1$ / B0-B15 | 3 | 2 | 1 | 0 |
|---|---|---|---|---|
| 0, 4, 8, 12 | 1 | 2 | 3 | 0 |
| 1, 5, 9, 13 | 2 | 3 | 0 | 1 |
| 2, 6, 10, 14 | 3 | 0 | 1 | 2 |
| 3, 7, 11, 15 | 0 | 1 | 2 | 3 |

FIG. 10
| B (0-3) / -B(12-15) \ Y2,Y3 | 3 | 2 | 1 | 0 |
|---|---|---|---|---|
| B (0-3) | 1 | 2 | 3 | 0 |
| B (4-7) | 2 | 3 | 0 | 1 |
| B (8-11) | 3 | 0 | 1 | 2 |
| B (12-15) | 0 | 1 | 2 | 3 |
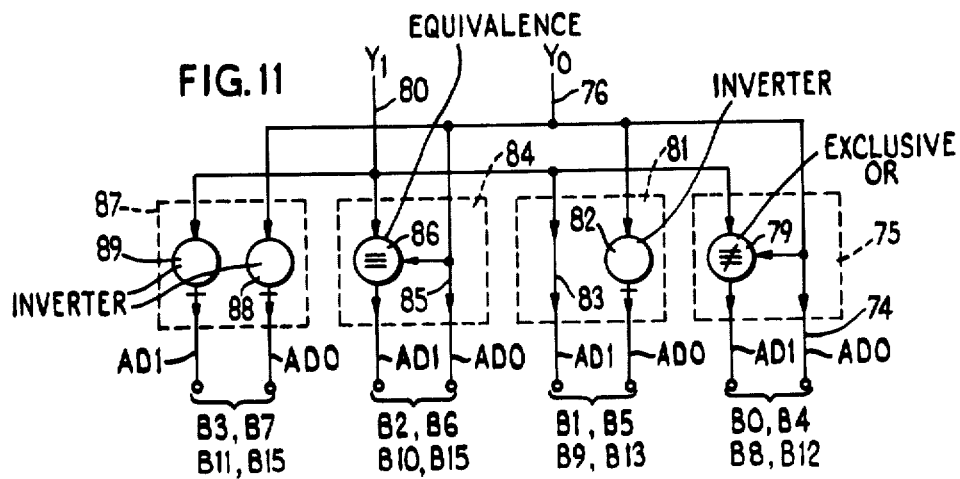
FIG. 11
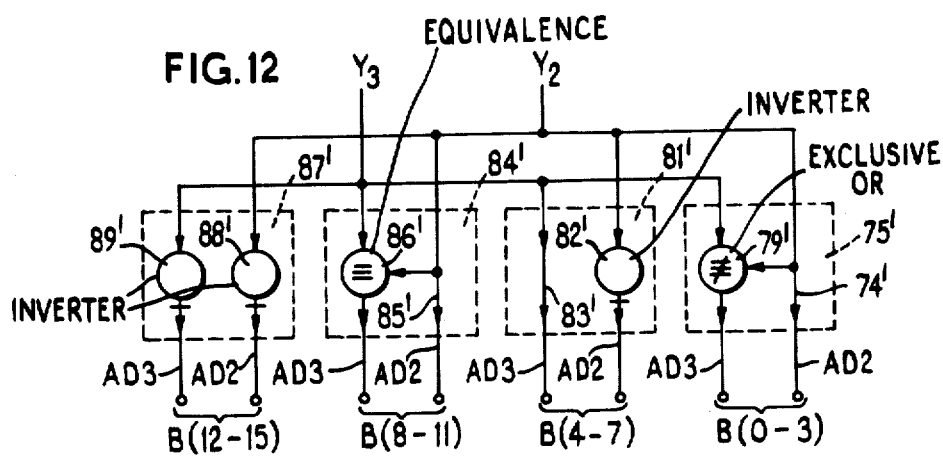
FIG. 12

APPARATUS FOR WRITING DATA IN UNIQUE ORDER INTO AND RETRIEVING SAME FROM MEMORY

This application is a continuation-in-part application of parent application Ser. No. 742,230, filed Nov. 16, 1976, now U.S. Pat. No. 4,112,487.

This invention relates to data processing and in particular to apparatus for the storage of information items, having application in one particular embodiment to the comparison of the information items.

It is frequently necessary or desired to compare an item of information with other items to find one or more matches for all or part thereof. Where only two items of information are involved a simple comparison for example using a single arithmetic step in one machine cycle is most appropriate. However, where one or more information items are to be matched against a substantial number of items in a data store a process of sequential comparison is very time-consuming. To meet this situation associative stores, often called content-addressable memories, have been developed for identifying those stored items for which a match is found between predetermined portions thereof and an input item. Such stores are available in integrated circuit form but are expensive, and of small capacity especially compared with normal random-access writable storage. If, however, one uses normal random-access writable storage, a large number of machine cycles are required to check through the entire contents of the store for a match.

Similarly, it is frequently necessary to carry out a search amongst words stored in a store to inspect a particular bit of each word. Such a bit may be, for example, a flag indicating the presence of valid data, a sign bit, or any other bit identifying a particular feature of each store word. If this bit occupies the same position in each word, as would usually be the case for a flag or a sign bit, then known techniques involve reading out each word in succession to inspect the required bit.

It is an object of the present invention to provide data processing apparatus in which the number of machine cycles required for comparisons involving a plurality of stored information items is reduced, without the need to use conventional associative stores.

According to the present invention there is provided data processing apparatus which includes a storage circuit or memory, and an addressing circuit for identifying word locations within the storage circuit or memory into and from which a plurality of information items are to be written and read, respectively. A translating circuit is provided for successively shifting, in a write mode of operation at least a portion of each information item so that it is stored in the storage circuit in a manner that the stored information item in each word location has a bit order different from that order of any other information item as stored in the storage circuit. In a read mode of operation, the de-skewing circuit shifts the information items as read out from the storage circuit in a direction opposite to that imparted during the writing mode. In particular, the contents of one or more unique bit positions from each of the plurality of word locations are read-out simultaneously, the significance of each digit in its encoded information item being the same.

In an illustrative embodiment of this invention, the translating circuit is operable to apply to each successive information item, to be written into the storage circuit, with an end-round shift of a predetermined number of places and in a predetermined direction relative to the preceding information item.

The translating circuit may illustratively also be operable to read an information item from a single word location and to arrange the bits of data to read out in their original order.

In a preferred embodiment of this invention, the data processing apparatus includes an encoding circuit for causing at least a portion of each information item to be encoded and stored in the unique bit order within the storage circuit or memory. In this illustrative embodiment of this invention, the encoding circuit encodes the information item in a one-out-of-n code. Further, the data processing apparatus includes a comparison circuit for comparing a selected single bit of a word read-out by said reading circuit with another single bit of a different information item to determine the bit significant for reading purposes to correspond with the significant bit of a similar 1-out-of-n coding of the information word to be compared.

Writable storage may be used for the one-out-of-n coded portions but will differ at least in its addressing control from that for the remainder of each information item, but both are preferably made up of conventional random-access writable storage modules in integrated circuit form. Individual integrated circuits for the coded storage needs to be bit-addressable and is conveniently embodied as a plurality of one bit wide integrated circuits (bit column stores) whereas the remaining storage may be of integrated circuits that are word organized, e.g. in modules four or more bits wide.

Preferably, the unique digit orders are based, directly or indirectly, on unidirectional end-around shifting of all or parts of successive n digit words by one digit position relative to the previous word so that, on a square matrix, digit positions of the same significance for successive rows or parts of rows are relatively skewed to appear on diagonals of that square matrix.

This skewing may be done separately for different square submatrix portions of an overall n×n matrix for the coded store portion, and these portions can themselves be subjected bodily to position codes that may, with advantage, be based on the same unidirectional end-around shifting transformation.

Each diagonal, or set of diagonals where part arrays or matrix portions of the overall matrix are concerned, will have a different digit significance that is the same for all n information items. Addressing of the store has thus to be arranged to extract bits on such a diagonal or set of diagonals and the presence of a predetermined bit value will represent a matching item. For convenience, the term "skewing" as used herein is intended to extend to superposed group rotation of the bits of coded words already subjected to differential rotations.

For skewed bit addressing on a comparison read-out, a part or field of the word to be compared may be separately transformed as many times as necessary to give, for that field, equivalently significant fields of address words to be applied to the bit column stores so as to correctly bit-address those column stores. One part or field will identify a bit within each submatrix bit portion where there is a superposed bit portion rotation and another portion or field of different significance will be analogously treated to give another address field that identifies the submatrix concerned in each bit column store. The number of separate transformations required for the former field will be equal to the number of bit columns in a submatrix bit portion and the number required for the latter fields will be equal to the number of submatrix bit portions represented in each bit column store. Preferably, 4×4 bit submatrix portions of 16×16 bit store blocks are used so that a four bit address has its two lowest significant bits transformed to identify bits within bit portions and the other two bits transformed to identify the bit portion concerned. Where more than n information items are involved, and thus a corresponding number of addressable word locations are required, the storage circuit or memory to which the invention is to be applied may, in effect, be operatively split into two or more n-word store blocks preferably operable relative to the same input word for comparison purposes. Where the plurality of word blocks share the same integrated circuits, skewed bit addressing of the store blocks may be done sequentially with more significant bits applied directly (i.e., untransformed) to select a store block. Simultaneous comparisons are possible where more than one bit column storage unit, e.g. integrated circuit, is required in each bit column store and their outputs are not compared. Potentially, of course, such simultaneous operation is possible for different input words for each such store device if sufficient register space is provided and the relevant comparison word is inserted in a register assigned to a corresponding bit column store device.

Coding one-out-of-n and storing a unique digit order allows a single significant bit value to represent, when read out, that there is a match between the corresponding information item or portion thereof and an input information word to be compared.

Where a portion only of an information item is so coded the significant bit value will indicate each item for which that portion matches. That portion may be a flag or classification section for a plurality of items of the same or a similar case, e.g. integers or any other class of data, or other particular properties or parameters such as color, size, age etc., present in a file of data relating to people, objects, places or combinations thereof.

Alternatively, that portion may be simply a fragment or field of an information item of which the remainder or at least other fields are to be compared with corresponding further portions of the information word to be compared. Even if several matches are found for the coded portions of information items, and subsequent comparison is in separate machine cycles, a complete comparison operation will take far fewer cycles than required for full sequential comparisons. Furthermore, normal writable storage circuit only is required together with appropriate addressing logic and that is cheaper and/or more flexible in application than conventional content addressed store modules.

In its broadest aspect the invention envisages using space and/or digit position significant codes other than one-out-of-n. In this context space means that most of the digit positions allocated to the code are, for any particular code value, all of the same value. One-out-of-n is, of course, an extreme case of such codes. If other codings are used that put significant bit values in more than one digit position further logic circuitry will usually be required to identify one or more stored items to be further investigated in subsequent machine cycles. It may also be that more than one skewed store access is made, for example one for each significant bit position and logic circuitry used to process the results of such a plurality of skewed accesses.

In this specification the term "digit order" refers to the order in which the digits of the original information item are stored, and the term "bit position" refers to the position of any particular bit of a stored item in the store.

Specific implementation of the invention will now be described, by way of example, with reference to the accompanying drawings in which:

FIGS. 1A and B are schematic block diagrams of illustrative embodiment of this invention;

FIGS. 2A and B are diagrams each showing the organization of the stores of FIGS. 1A and B;

FIG. 3 is a block diagram of a preferred embodiment of a system embodying the invention;

Figures 4, 5:
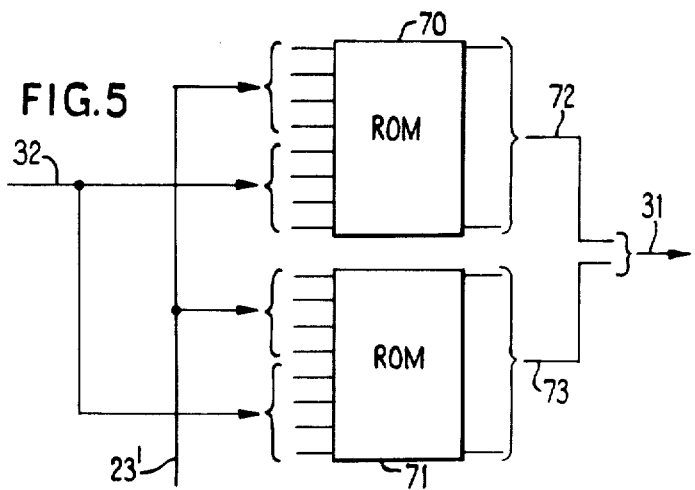
FIG. 4 is a diagram showing a preferred organization of a store block of FIG. 3.
FIG. 5 is a block circuit diagram of a store block loading facility.
Figures 6A, 6B:
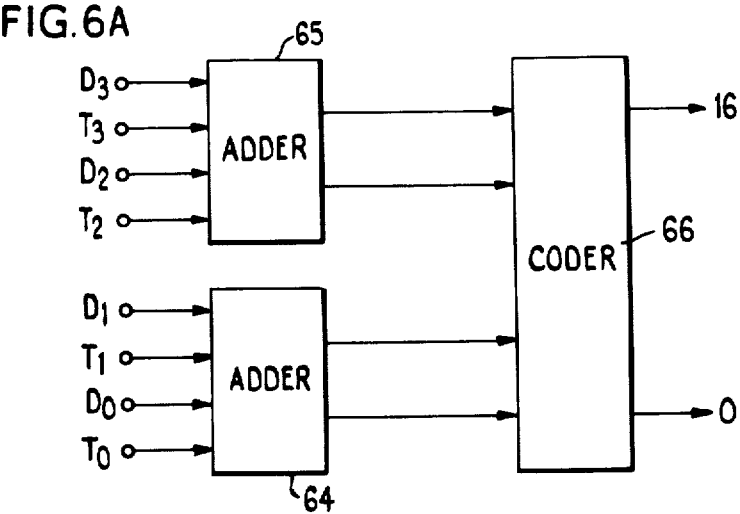
Figures 7, 8, 9:
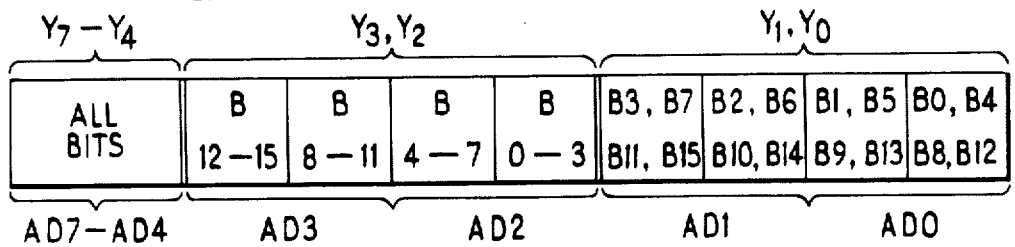
Figure 13:
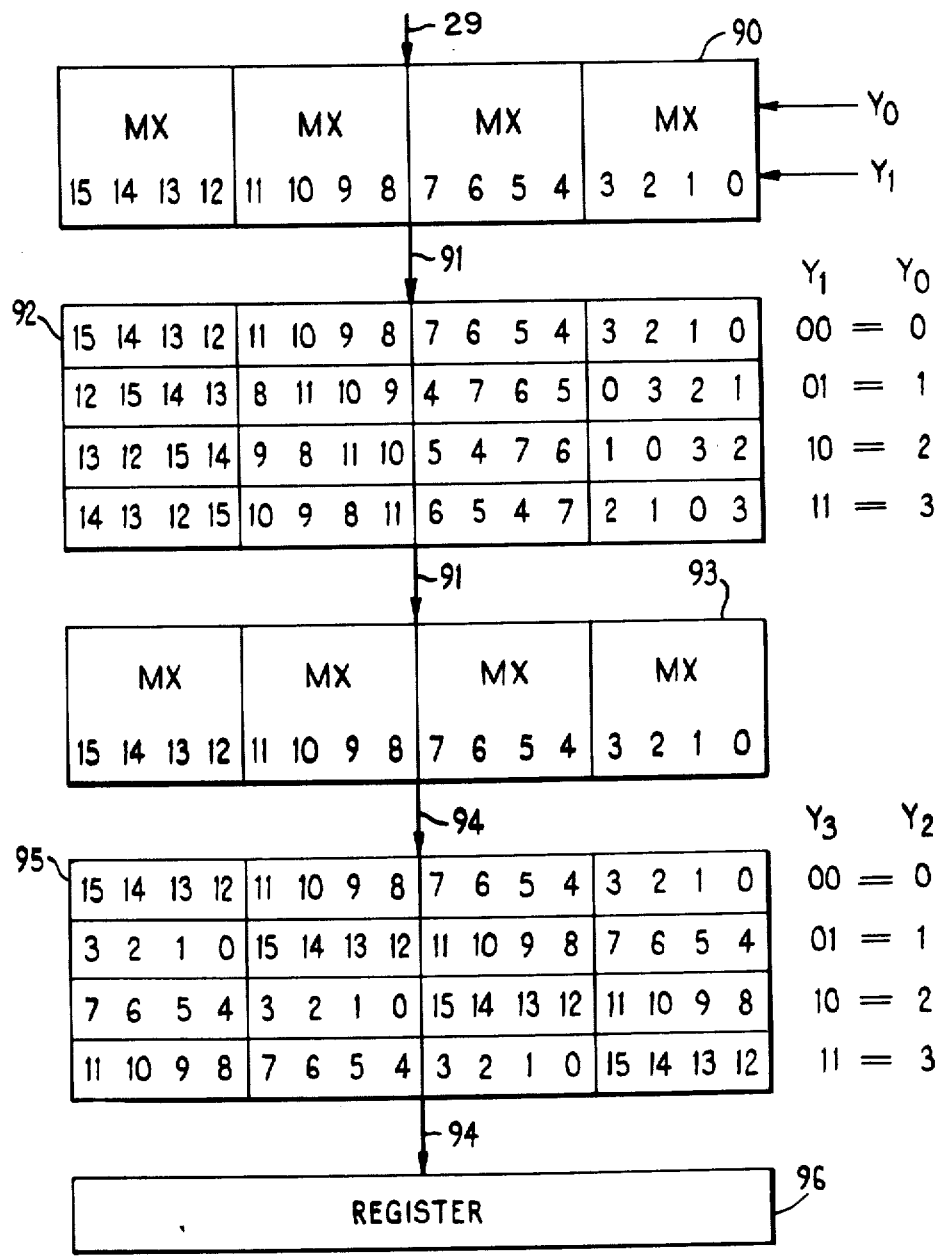
Figure 14:
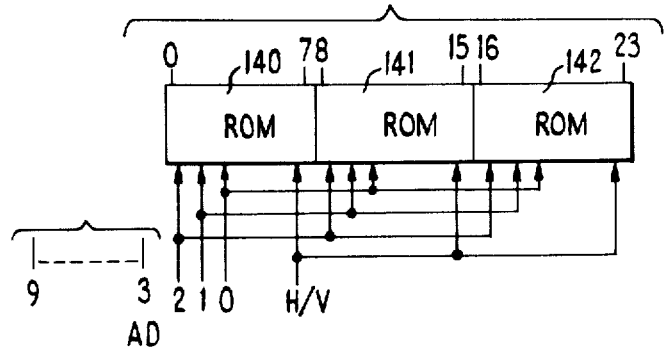

FIGS. 6A and B are a block circuit diagram of an alternative store block loading facility and a truth table for the logic employed, respectively;

FIG. 7 is a diagram showing how an eight-bit address word can be used to skew access a store block;

FIG. 8 is an example of the operation of the address word of FIG. 7 for bit significance 2 in FIG. 4;

FIG. 9 is a truth table for address transformations appropriate to addressing bit portions of a stored block;

FIG. 10 is a truth table for address transformations appropriate to identifying a bit portion of a stored block;

FIGS. 11 and 12 are logic circuit diagrams of a skew addressing facility in accordance with FIGS. 8, 9, and 10;

FIG. 13 is a block circuit diagram of an output facility combined with transformation truth tables therefor;

FIG. 14 is a schematic diagram of part of the apparatus of FIG. 1B; and

Figure 15:
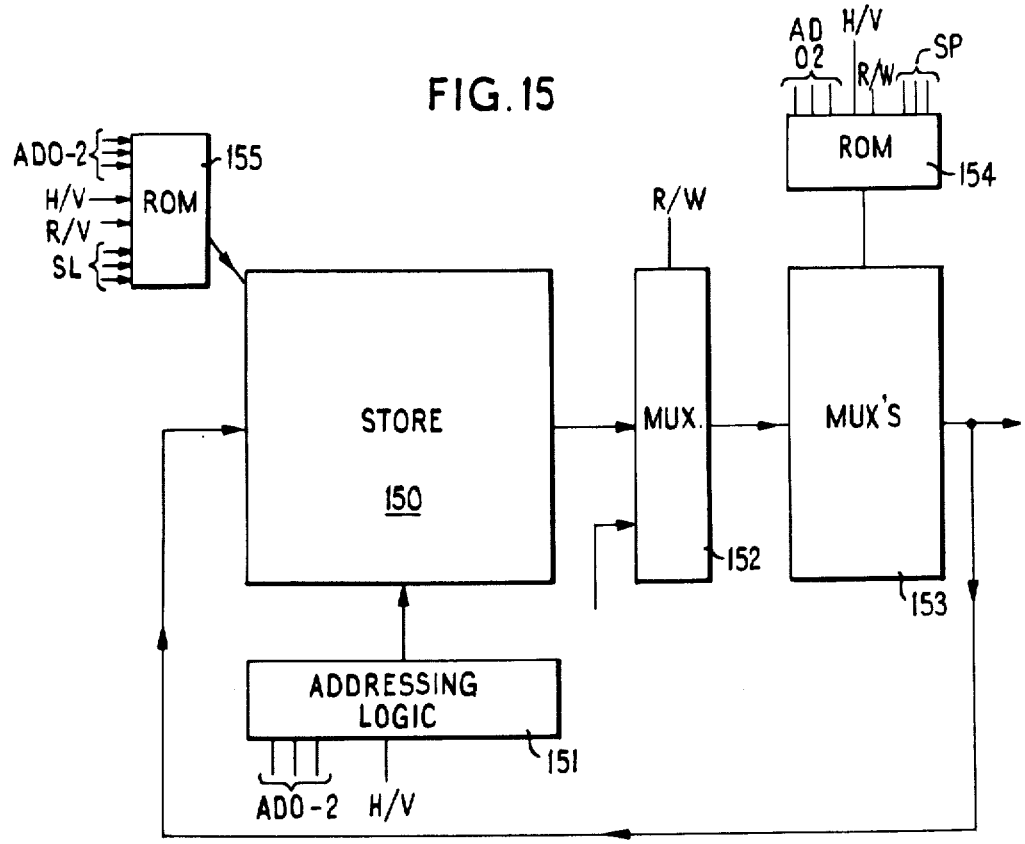

FIG. 15 is a block schematic diagram of a second embodiment.

FIG. 1A illustrates in a general fashion a block diagram in accordance with the principles of this invention. This is shown on a small scale for simplicity, and considers a situation where input data is presented in 8-bit words with the three least significant bits of all words always defining a feature or features of the information carried by the remaining five bits. The input data word will be applied to an 8-bit input register 10 for subsequent application to a store 11. The store 11 consists of two parts. One of these parts 12 is a normal store arranged to hold the 5 most significant bits of the input data word. The other part 13 of the store 11 is eight bits wide. The three least significant bits from register 10 are passed through an encoder 14 arranged to encode its input as a one-out-of-eight output which is applied to the store part 13. Only the first word of storage of store 11 is shown.

FIG. 1A also illustrates the operation of the arrangement just described. Considering the 8-bit number shown in the register 10, bits 3 to 7 are passed directly to store part 12. Bits 0 to 2, representing in binary form the decimal number 5, are encoded such that the resulting output to store part 13 puts a '1' only in the position of bit 5 in that store parts, all other bits being '0'.

Referring now to FIG. 1B, this shows a further illustrative embodiment of the invention in which each successive information item is stored with a one-place left end-around shift relative to the preceding information item. In contrast to the embodiment of FIG. 1A, the embodiment of FIG. 1B does not employ a decoder. A storage means is shown in the illustrative form of a writable storage circuit or block 110, having a capacity of eight 8-bit words. The store block 110 is conveniently made up from eight bit-addressable integrated circuit bit column stores, that is stores which are one bit "wide" and eight words "long". Each such store usually has built into it the necessary addressing circuitry, having three external addressing connections. The addressing of the store block 110 for both reading and writing is determined by addressing means illustratively taking form of an addressing logic circuit 111 controlled by some external means such as a computer (not shown).

Data read out from the store block 110 is applied to a multiplexer 112, which controls the read or write function. New information items to be written into the store block 110 are also applied to the multiplexer 112 which is controlled by a "read/write" signal RW, also from the computer. The computer will probably, though not necessarily, be the source of the input information items applied to the multiplexer 112. The outputs of the multiplexer 112 pass through three further multiplexers 113, 114 and 115. These multiplexers form an illustrative embodiment of a translator means as identified in FIG. 1B, by the numeral 109, to determine the extent to which each successive information item is shifted or translated, and the direction of shift necessary to ensure that the correct storage pattern is produced, with each word location carrying the stored information item in a different order. In the illustrative embodiment of FIG. 1B, the multiplexers 112, 113, 114 and 115 serve also as shift means. The three multiplexers 113, 114 and 115 are operable to apply a specified shift to each bit of the information item, or no shift at all. Hence multiplexer 113 applies a shift, left or right, of either four places (or bit positions) or zero, multiplexer 114 applies a shift of two places or zero, and multiplexer 115 applies a shift of one place or zero. Hence any shift from zero to seven places, and in either direction, may be applied. The operation of the three multiplexers 113, 114 and 115 is controlled by a read-only memory 116.

The read-only memory 116 is arranged to apply the necessary shifts dependent on the address into which an information item is to be written. Since the store block 110 has a capacity of eight words, three address bits are applied, indicated as AD0, AD1 and AD2. Two other inputs to the ROM 116 control determine the read/write function RW, and the "direction" of read-out or writing H/V. The latter function will be described later. As already indicated, the shift to be applied to an information item on read out has to be the complement on that applied when the item is written into the store 12, and the read/write input to the ROM 116 controls that function.

FIG. 2A shows the organization of the storage capacity of store block 13 of FIG. 1A and the store block 110 of FIG. 1B. References W0 to W7 indicate the locations of the eight information items or words within the store, while references B0 to B7 indicate the eight bits of each word. The numbers indicate the positions occupied by the bits of each information item. The first item to be stored has no shift applied that its bit 0 is in bit position B0, bit 1 in position B1 and so on. The next stored item has a one-place left end-around shift applied, so that bit 0 is in bit position B1, bit 6 is in position B7 and bit 7 in position B0. Each successive item has an additional one-place left end-around shift applied, as shown in FIG. 2A. Hence the last item has a seven-place left shift applied to store the bits in the order shown.

With reference to the embodiment of FIG. 1A, a suitable translating circuit (not shown in FIG. 1A) to be explained below, is coupled to the output of the encoder 14, shifts each successive word, comprised of an one-out-of-eight encoded output of the encoder, one bit to the left relative to the preceeding word. Hence, as shown in FIG. 2A, all the least significant bits, that is bit 0, will occupy the major diagonal of the store. Other selected bits, say bit 5, may be found on two minor diagonals of the store.

If a search to be carried out requires the retrieval of all information in those data words whose three least significant bits have a decimal value of 5, then it is necessary to look at bit 5 of each of the eight stored words. If these were stored without the one-bit shift between successive words it would be necessary to search each word in turn. However, as shown in FIG. 2A, all the bit 5's may be read out in a single operation by addressing a different bit of each word. For example it will be necessary to address bit 5 of word 1, bit 6 of word 2, bit 7 of word 3, bit 0 of word 4, and so on. The use of this combined coding and shifting technique greatly simplifies this type of searching.

The example given above is a simplification of actual requirements. A search store of this type, as represented by store part 13 in FIG. 1A, would probably be more than 8 bits wide. In addition, the addressing is in practice rather complex since it has to allow for the checking of any desired bit in each word. In order to simplify the addressing, the store part 13 may be divided into smaller sub-divisions.

The operation of writing the information items into the store block, as described above with respect to FIG. 1A is referred to as "horizontal" writing, and similarly the reverse operation of reading a complete item from the store is referred to as "horizontal" reading. The necessary shifting is controlled by the H/V input applied to the ROM 116. The alternative mode of reading or writing is referred to as "vertical" read-out or writing. As already explained, it is frequently necessary to examine one particular bit of each item, which always occupies the same position. For example, the most significant bit may be a flag or a sign bit, and the first, that is the least significant, bit may indicate whether the number forming the information item is odd or even. With the words stored in the manner described it is a simple matter to read out the same bit of each information item in a single operation.

Figure 2B:
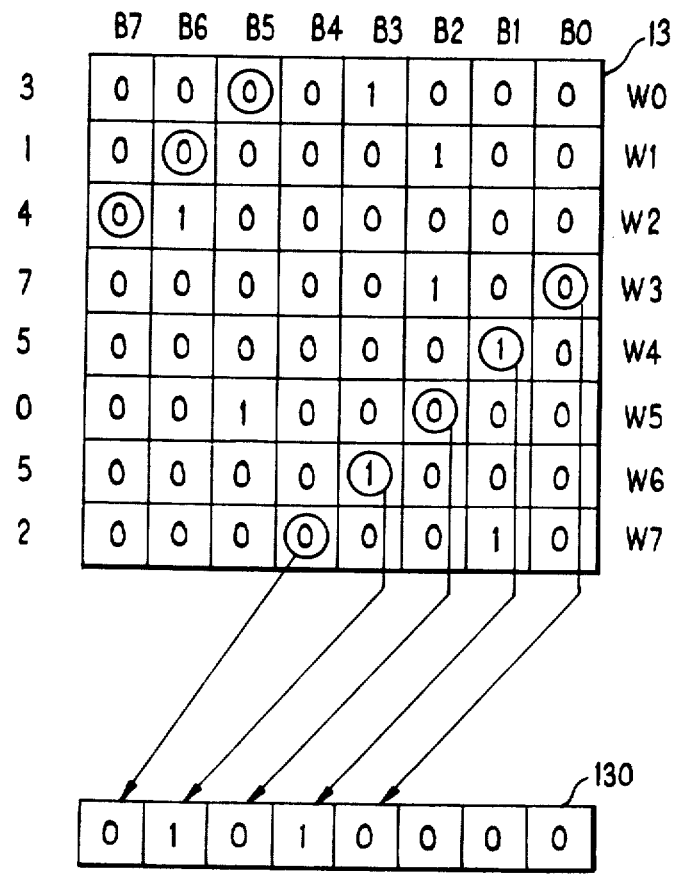

FIG. 2B illustrates this feature of the invention in greater detail showing illustratively the store means in the form of the store block 13. The store block 13 or 110 has stored in its eight eight-digit word locations the encoded equivalent of the decimal numbers shown on the left. Hence word location W0, being the encoded equivalent of decimal 3 in a one-out-of-n code, has a '1' in the bit 3 position B3. All other bits are zero. The second word location W1 contains the encoded equivalent of decimal 1, but with a one-bit left end-around shift. Hence the digit '1' instead of being in the B1 position, is shifted one place to the left into the B2 position. Successive encoded numbers have a onebit left end-around shift applied in addition to that applied to the previous word. Hence word W2 being the encoded equivalent of decimal 4, has the digit '1', not in the B4 position but two places to the left in the B6 position.

This technique of encoding and end-around shifting is applied to each successive word location.

If, as described above, bit 5 of each encoded word contains a feature to be searched or examined and occupies a different position in the store 13 or 110, then as already stated all the bit 5's may be read simultaneously. This is because the successive end-around shift applied to each encoded word has placed each bit 5 in a different column in the store. These locations are circled in FIG. 2B, showing the eight digit positions which may be addressed simultaneously. In particular, this necessitates addressing bit position B5 in word W0, position B6 in word W1, position B7 in word W2, position B0 in word W3, and so on. The output from the store will thus be the data held by each of the bit 5's of the original information items. It is necessary to present these bits in the correct order, and FIG. 2B shows an output register 130 to which the bits are passed after shifting by the multiplexers 113 to 115, for example, so that bit 5 of the information item in word 0 occupies bit position B0, that from word 1 occupies bit position B1, and so on.

In addition to the "vertical" reading of stored data, it is also possible to apply vertical writing techniques to change a selected bit in each information item. If, for example, bit 7 is a flag indicating the validity of the rest of the information item, then each bit 7 may be changed by writing into each bit 7 simultaneously since each bit 7 occupies a different bit position in the store.

It is convenient to re-arrange the bits so read out such that the bit from word location W0 occupies the B0 position in the output word, as stored in register 130, the bit from word location W1 occupies the B1 position, and so on. This is illustrated, in part, on FIG. 2B, where the re-arrangements of the digits from word locations W3 to W7 is indicated.

As already stated, codes other than one-out-of-n may be used. In the care of the eight-bit words described above, the decimal numbers shown in FIG. 2A may be encoded in an m-out-of-n code, where m is less than eight. Hence a two-out-of-eight code would provide '1's in two bit positions in each word. In such a case, instead of searching for the condition of a single bit from each word location it would be necessary to check a pair of bits from each word location.

FIGS. 3 and 4 are concerned with the embodiment of FIG. 1A, including a storage arrangement or means taking the illustrative form of a writable storage circuit 20; for use with a 16-bit data word, of which the four least significant bits are coded by a one-out-of-16 encoder. To simplify the addressing, the 16 by 16 bit store array is subdivided into 4 by 4 bit subarrays.

FIG. 3 shows the writable storage circuit 20, which comprises the memory of this invention and is word organized and comprises two parts 21 and 22 of which the part 21 is conventionally arranged and controlled to be addressble over lines 23 to produce on output lines 24 a milti-bit word output from the addressed location. In the claims attached hereto, part 22 is illustratively recited as a first part and part 21 as a second part. For convenience, the store part 21 will be assumed to be twelve bits wide and to comprise 256 words, though it should be understood that the store may be designed for more or less words that can be shorter or longer in bit length. The store part 22 is indicated as being at least notionally broken into blocks 25 and 26 of writable storage that is both bit and word addressable by address means illustratively taking the form of an address circuit 27, preferably being formed as separate 256×1 bit column stores. In general, the store blocks 25 and 26 will, together, have a plurality of word organized locations corresponding one-to-one and word addressable with the word locations of the store part 21, and each will comprise a plurality of bits capable of expressing a portion of an information item in one-out-of-n code. In the particular example mentioned above, the blocks 25 and 26 are sixteen bits wide and so are capable of expressing four digits of true binary code in one-out-of-sixteen code, i.e., an unique bit position for each four-bit numerical value. The four-bit portion will be part, for example the least significant bits, of a sixteen-bit information item of which the remaining twelve bits are stored in the corresponding location of store part 21. The word addressing aspect of address circuit 27 is conventional and will not be discussed further, attention being directed to the bit addressing aspect.

An exemplary store location is indicated at 28 where bits 0 to 15 of storage block 25 represent a one-out-of-sixteen coding of the least significant four bits (0 to 3) of a sixteen-bit information item of which the remaining bits (4 to 15) are stored at a corresponding location in the store 21.

The storage blocks 25 and 26 have several modes of operation. They can be read on a word organized basis simultaneously with reading the corresponding location in store part 21, and lines 29 are shown as common outputs therefrom for the one-out-of-n coded word; addressing may be via lines 23 in common with reading of the store part 21. Writing to the store blocks is also conveniently on a word basis and simultaneous with writing to the store part 21, addressing again being, for convenience, assumed to be over the same lines 23. The word to be written will be provided by loading or encoding means illustratively taking the form of an encoder 30 operative to code part of each input information item on lines 32 and to impose a unique digit order in its outputs 31. In FIG. 3, circuit 30 is designated by the term "loader". For simple diagonal skewing the encoder 30 may comprise a binary to one-out-of-n coder that receives the least significant four bits of the information item concerned over lines 32, and a re-entrant shift network that receives the code outputs and supplies the store blocks 25 to 26 via lines 31.

Such a shift register serves to skew the bit significance of the code word so that bits of the same significance appear progressively shifted by one digit position on a matrix representing bit storage elements of a store block 25, 26.

The store blocks 25 to 26 are also required to be operative for read-out on a diagonal basis and so need to be bit-addressable column by column and simultaneously. This requirement arises from the way in which comparisons are to be done between desired bits of a word Y and the contents of one of the blocks 25 to 26. A register 40 is shown for the word Y. The least significant stages feed, via lines 41, the address circuit 27 that is effective to generate appropriate diagonal element enabling signals over lines 43.

In FIG. 3 the blocks 25 and 26 are shown as sharing output lines 29 even in their diagonal read-out mode of operation as will be required where each column is an integrated circuit device. Then considering only one block, say 25, any line having the one-out-of-n coded bit value will represent a match between the least significant bits of the word Y and the corresponding word location in the block 25 and store part 21. The store block outputs 29 are shown applied via branch lines 45 to a comparator means illustratively taking the form of an address identifier circuit 46 whose outputs 47 will represent the corresponding store address or location in the store block 25 and thus in the store part 21. That store location will contain the remainder of the matching information item which can then be addressed and read out onto lines 24 for further processing, for example, comparison with the most significant contents of the register 40 on lines 39.

In practice the address identifier circuit 46 will effectively gate through the address actually applied to the relevant bit column store of the blocks 25 to 26. Lines 43 are thus shown applied to the circuit 46 though the latter may, in reality, be part of the circuit 27 equivalent to gating on branches from the lines 43.

Sharing of the output lines 29 by the store blocks 25 to 26 implies that those blocks will be operated in separate, illustratively consecutive, machine cycles. The store block outputs 29 are also shown applied to a translating means, including a de-skewing and decoding circuit 51 for translating the skewed output into true binary code on lines 52, this circuit 51 being required on normal word addressing of the overall store configuration 26 to obtain a conventional sixteen-bit binary word.

Only where the store blocks 25 to 26 comprise or extend over bit column integrated circuits can they, or groups of them, have separate output lines and so be simultaneously addressed over lines 43.

Then separate address identifier circuits 46 will need to be provided for the outputs of each store block or group thereof, and the most significant bits of the store address will be set according to which identifier circuits detects a match.

The presence of a match in a store block skewed read will be indicated when the input of identifier circuit 46 is not all-zero, assuming, that is, that binary "1" represents the significant bit value of the address circuit 27. A match would, of course, also be indicated by a non-zero output of the circuit 46. However, it is convenient to detect a match using the input lines 45, especially where provision is to be made for coping with multiple matches i.e., where more than one of the lines 45 carries a binary "1" signal. For a system as described so far the circuit 46 will need to be operated separately for each binary "1" received and that will require logic in the lines 45 for detecting binary "1"s and controlling their application to the coder 46.

FIG. 4 shows a preferred ordering of the original digit significance as stored in one of the store blocks 25 or 26. This is based also on end-around shifts but now applied to the outputs of one-out-of-n coder 30. Again a 16-bit code word is assumed so that the store block shown is a 16×16 bit array. The sub-array portions treated separately are 4×4-bits so that there are sixteen such portions for each store block array. Also the separately shifted portions are themselves bodily shifted end-around relative to their positions in rows of a matrix array of those portions. In particular, the specific 4×4-bit portions are shown in FIG. 2 to have been subjected to bodily shifts that exactly parallel those for each individual portion which itself exactly parallel the successive unidirectional endaround shifts of one bit position at a time. As will be described later this arrangement allows a particularly advantageous form of bit addressing control.

The sixteen word locations are labelled T0 to T15 for rows and the conventional bit significances are labelled B0 to B15 for columns, so that individual bit locations are coordinate identified e.g. T0, B0, for the top right bit. The 4×4-bit portions have coordinates T0-T3, T4-T7, T8-T11, T12-T15 for rows and B0-B3, B4-B7, B8-B11, B12-B15 for columns. Now, for example, the top-right sub-array portion has coordinates T0-T3, B0-B3. In the first row of sub-array portions T0-T3 the bit significances of the original coded word appear in their original order for location T0 and the four portions B0-B3, B4-B7, B8-B11, B12-B15 relate to the bit significances 0-3, 4-7, 8-11 and 12-15 respectively. Then, in each sub-array portion separately, successive end-around shifts are shown for locations T1, T2 and T3 so that the lowest bit significances of each portions namely, 0, 4, 8 and 12 occupy the main diagonals of the four positions and each other bit significance occupies complementary minor diagonals. For this first row of subarray portions all of the original bit significances are shown so that the identity of the operations for each portion is evident.

For the second row of sub-array portions T4-T7 the original bit significances 0-3, 4-7, 8-11, 12-15 now occupy subarray portions B4-B7, B8-B11, B12-B15, and B0-B3, respectively i.e., a bodily end-around shift comparable to that from location T0 to location T1 within each of the first row of sub-array positions. As can be seen fully for portion T4-T7, B4-B7, relating to original bit significances 0-3, and skeletally for the other portions, each sub-array portion undergoes the same shifts from locating T4 to T7 as it does from location T0 to T3.

Further bodily rotational shifts of the portions are shown skeletally in the lower half of the FIG. 2A relative to the third and fourth rows of sub-array portions T8-T11 and T12-T15.

It is noted that for each sub-array portion individually the relation of stored to original bit significances is represented by major and minor diagonals and that a further similar relation is superposed in shifting the portions bodily. As can be seen, the original bit significances 0 to 3 and the major diagonals (4, 8 and 12) of the other portions make overall diagonals as described for FIG. 1, but the other bit significances are altered by the superposition. Despite this superposition, the resulting ordering of the original bit significances is referred to herein as "diagonally related". Other forms of skewing or reordering may achieve an equally satisfactory result in terms of economy of the bit addressing logic.

FIG. 5 shows a suitable loading arrangement instead of the coder and re-entrant shift register designation previously ascribed, illustratively, to block 30 of FIG. 3. Use is made of read-only memories that are readily available commercially. For sixteen bit locations of the store blocks, two 256×8 bit read-only memories 70 and 71 are used, each addressed over eight lines 32 presenting in binary code the store block address bits on four lines and the four least significant digits of the information item to be stored. This addressing is accordingly shown as from the least significant lines 23' of addressing cable 23, and the lines 32 of FIG. 3. Each read-only memory 70, 71 has sufficient locations to accommodate all possible permutations of the addressing lines and provides an eight bit output on lines 72, 73 and these constitute different halves of the store block input lines 31.

An alternative loading facility is shown in FIG. 6A together with a truth table in FIG. 6B. FIG. 6A shows two two-digit adders 64 and 65 but each with only two outputs for the least significant digits. The inputs of adder 64 are shown to be the two least significant bits T0, T1 of the relevant store block address and the two least significant bits D0, D1 of the data to be written to store. A truth table is shown in FIG. 6B for the action of the adder 64 on the inputs D0, D1, T0, T1, and next to the output column there are normal decimal representations as used in FIG. 4. From those representations it should be clear that the adder 64 performs the skewing for each of the 4×4 bit portions, the representations in fact corresponding to the first square T0–T3, B0 B3 of FIG. 4, i.e., with no offset.

The adder 65 is operative relative to its inputs D2, D3, and T2, T3 in the same way as adder 64, and its outputs constitute the next two significant digits of a four-bit word that is shown applied to a binary to one-out-of-16 coder 66. The coder outputs are also indicated in significance from the bottom upwards as feeds for the store block columns but these outputs in fact carry the skew ordered digits. The action of the adder 65 obeys a truth table similar to that shown for adder 64 and its outputs specify particular sub-array portions of FIG. 2 with the required skewing, i.e. impulse desired offsets to the outputs of adder 64.

As mentioned above, the bit columns B0 to B15 may comprise separate integrated circuit random access stores that are one bit wide and such stores will be more than sixteen bits long, typically they may be 256 bits long and sixteen such stores will thus accommodate sixteen of the store blocks 25 of FIG. 4. An eight-bit address used for bit selection will thus have its four most significant address bits used to identify a run of sixteen bits corresponding to a particular store block. The remaining four address bits are used to identify one bit in each of the sixteen column stores within that particular sixteen-bit run and the bits so identified will be those of a desired original bit significance. A four-bit word or word part designating the desired original bit significance therefore has to be translated to give the appropriate four least significant address bits for each bit column store. In effect, two bits identify the run of four bits corresponding to a particular sub-array portion, and two bits identify one bit within that run of four. Because of the particular superposed ordering pattern shown in FIG. 4, this can be achieved using identical translation logic for the two least significant bits and the next two bits.

FIG. 7 illustrates the basic translations to be performed to achieve the required skewing for each store block directly from the contents of the register 40 of FIG. 3. The partitioned box is intended to show how, for the eight digits 0 to 7 of a binary word Y representing the original bit significance, the values of the least and next least significant pairs of digits are translated relative to the bit columns B0 to B15 and 4×4 digit sub-array portions P (0–3), P (4–7), P (8–11) and P (12–15) of a store block to form equivalently significant pairs of bits 0, 1 and 2, 3 of the address word D for the bit column stores.

The four right-most compartments relating to translation of the least significant pair of bits $Y_0$, $Y_1$ to AD0, AD1, reflect the fact that the internal skewing of each 4×4 bit sub-array portion P is the same and that bit column groups B0–B3, B4–B7, B8–B11 and B12–B15 can be similarly treated, the middle four compartments serving to select the appropriate 4×4 bit subarray portion P for each column group.

As an example of the translations represented by FIG. 7, the bit column store addresses for an original bit significance of value two (i.e., 0000,0010) are shown in FIG. 8 for one store block i.e., considering only the four least significant digits (0010). The identity with FIG. 4 where the locations of original bit significance 2 are shown fully is clear. Hence, considering FIG. 4, the bit having original significance 2 is to be found in word T2 for bit column store B0, word T3 for bit store B1, word T0 for bit store B2 and word T0 for bit store B3. Similarly, the required bit is to be found in word T6 for bit store B4, word T6 for bit store B5, word T4 for bit store B6, and word T5 for bit store B7.

A further insight into the translation within each 4×4 bit sub-array portion may be gained from FIG. 9 which shows a truth table useful for indicating the logic required to perform these translations. In particular, FIG. 9 shows columns relating to values of the least significant bit pair $Y_0$ $Y_1$ and rows relating to the translation for respective ones of the right-most compartments of FIG. 7. Again taking the original bit significance of two it is seen that address value 2 is required for columns B0, B4, B8 and B12; address value 3 is required for columns B1, B5, B9, and B13; address value 0 is required for columns B2, B6, B10 and B14; and address value 1 is required for columns B3, B7, B11 and B15.

All that is required to fully realise FIG. 9 is the appropriate offsets for each bit column group B0–B3, B4–B7, B8–B11, and B12–B15, namely 0, 1, 2 and 3, respectively, for the next pair of address digits AD2, AD3. The truth table for these digits is shown in FIG. 10 and is identical in value to that of FIG. 9, so that similar logic circuits will be satisfactory. Suitable logic circuits are shown in FIG. 11 specifically for a least significant bit pair.

The function of the compartment labelled B0, B4, B8, B12 in FIG. 7 is shown realised at 75 in FIG. 11 in accordance with the first rows of the FIG. 9 table by a direct connection 74 from $Y_0$ line 76 to AD0 lines for the bit column store concerned, and a connection to the corresponding AD1 lines from the output for a nonequivalent circuit 79, otherwise called an Exclusive-OR-circuit, fed from both $Y_1$ line 80 and the $Y_0$ line 76. The function of the compartment labelled B1, B5, B9, B13, in FIG. 7 is shown realised at 81 in FIG. 11 in accordance with the second row of the FIG. 9 table by a connection from $Y_0$ line 76 to the AD0 lines via an inverter 82, and a direct connection between $Y_1$ line 80 and the AD1 lines.

The function of the compartment labelled B2, B6, B10, B14 in FIG. 7 is shown realised at 84 in accordance with the third row of the FIG. 9 table by a direct connection 85 between $Y_0$ line 76 and the AD0 lines, for those bit column stores, and a connection to the corresponding AD1 line from an equivalence circuit 86 fed from both the $Y_0$ and $Y_1$ lines. The function for the compartment labelled B3, B7, B11, B15 in FIG. 7 is shown realised at 87 in accordance with the bottom row of the FIG. 9 table by inverters 88 and 89 in connections between $Y_0$ line 76 and the AD0 lines for those bit column stores and between $Y_1$ line 80 and the AD1 lines, respectively.

Logic like that of FIG. 11 can also be used to realise the required translations between bit pairs $Y_2$, $Y_3$ and AD2 and AD3. To do this $Y_0$, $Y_1$, AD0 and AD1 lines would be made to correspond to $Y_2$, $Y_3$, AD2 and AD3 bits respectively, and the boxes 75, 81, 84 and 87 would perform the functions of the compartments labelled in FIG. 2 as B(0–3), B(4–7), B(8–11), and B(12–15), respectively. This is shown in FIG. 12 with primed references where appropriate.

The skewed bit addressing facility just described requires only sixteen address lines for each 16×16 store block and these are the lines AD0 and AD3 connected as indicated above for FIGS. 11 and 12. A further four lines will serve to identify any of sixteen such store blocks so that twenty address lines will serve the preferred 256×1 bit column stores readily available in integrated circuit form. Clearly, other sizes of column store can be served using an appropriate number of address lines.

As mentioned above, on normal word addressing, the outputs of the bit column store need to be re-ordered so that they can be further processed or if necessary, readily reconverted to true binary form in a one-out-of-n to binary converter. This "de-skewing" can be readily achieved using two banks of multiplexers as shown in FIG. 13, where the store block output lines 29 are shown applied to a bank of four 4-bit four-way multiplexers 90 controlled by the two least significant bits $Y_0$ and $Y_1$ of the addressing word. The lower edge of the bank of multiplexers 90 has indications of the actual bit significances of its outputs 91 and these, of course, represent the desired final re-ordering of the contents of lines 25. The multiplexers 90 serve to deskew each group of four bits corresponding to B(0-3), B(4-7), B(8-11) and B(12-15) of FIG. 4 and bits 0-3, 4-7, 8-11 and 12-15 of the multiplexers 90. De-skewing is done within each of the multiplexers 90 but not between them. The required transformations are, in effect, rotations that reverse the rotations made in originally skewing the 4×4 bit sub-array portions during loading. These reverse rotations are indicated in partitioned box 92 shown interrupting the multiplexer output lines 91 and are identified with particular values of the controlling bits $Y_0$, $Y_1$, which are shown both in binary and in normal decimal form as used in FIG. 4. Comparison of this table with the 4×4 bit sub-array portions of FIG. 2 will show the correction achieved which, as would be expected, requires the same rotation in each row of the box or table 92, but different rotations for each row.

These output lines 91 are shown applied to a second bank of four 4-bit, four-way multiplexers 93 that are controlled by the next two bits $Y_2$ and $Y_3$ of the addressing word. Again the lower edge of the box 93 shows the actual output significances of the multiplexers and, this time, these outputs 94 will carry the correct order of bits of the word read out. Partitioned box 95 in the outputs 94 shows the transformations required to complete the re-ordering. This time the transformations are between, not within, the multiplexers 95 and serve to reverse the bodily rotations of the 4×4 bit sub-array portions of FIG. 4. For convenience the outputs 94 are shown feeding a one-out-of-16 register 96, the output of which may be connected to a one-out-of-n to binary converter.

Embodiments of the invention can also be used for multiple association by having more than one bit of different and thus significant value in the store block word locations. This could be of particular utility in data processing relating to situations for which there are tolerances that do not correspond to binary powers.

The addressing logic 11 as generally shown in the embodiment of FIG. 1B is specifically shown in FIG. 14. It is assumed here that the store 110 of FIG. 1B is just one of a number of such store blocks. As already stated, each of the eight bit column stores making up the store 110 of FIG. 1B has three address inputs to identify a selected one of its eight storage locations. Three read-only memories 140, 141, and 142 are provided, each having eight outputs and four inputs. Three inputs of each memory are connected in parallel to bits AD0, AD1 and AD2 of a 10 bit address word. The twenty-four outputs of the memories are connected as appropriate to the twenty-four separate address inputs of the eight bit column stores. The fourth input of each memory is connected to the H/V function input already described. The remaining 7 bits of the address word are used to identify each storage block of the store.

The addressing logic described above with respect to FIG. 14 is only one possible form that the logic may take. An alternative form is to use a single read-only memory and to use appropriate gating to derive the necessary 24 addressing outputs.

The apparatus described above has concerned a a simple 8 by 8 bit store. In practice the stores may be considerably larger, and may have a bit capacity in each word location greater than the number of word locations. For example, the technique described above may be applied to store having a capacity of, say, eight 9-bit words. In this case, of the same one-place left end-around shift is applied as described above, then there will be no bit 5 in bit position B4, of the store block. Similarly there will be no bit 6 in bit position B5, and so on. The read addressing circuit will therefore have to be arranged so that the appropriate bit column store is not read.

It is not possible to have the number of word locations greater than the number of bits in each location. If this was done some bit positions in the store would contain a particular bit from more than one word location, so that both could not be read out in a single read operation.

It is possible to apply other "skew" patterns than the one-place end-around shift between successive information items described above. The end-around shift may be by any number of places up to the store limit, and smaller sub-areas of the store may also be shifted relative to one another, as contemplated by the embodiment of FIG. 1A. The application of such skew patterns would complicate the shift control arrangements represented by memory 116 in FIG. 1B. Equally, it is possible to read out more than one bit from each of a number of words. For example, if bits 0 and 1 are to be read from each of four 8-bit words, then the application of a successive two-place end-around shift will put each bit 0 and 1 from each word location into an unique bit position.

It has been assumed in the above description that when reading or writing vertically, all bit positions are involved. Situations may exist where it is desired to leave certain bit positions unread, or unaltered on write-in. This may be done by providing a further read-only memory which controls the "enable" inputs of the bit column stores, so that a signal must be applied from the memory before a store location can be read out or written in. Such a memory might have applied to it the three address bits AD0 AD1 and AD2, the two control inputs R/W and H/V, and also signals indicating either the particular bit positions to be ignored or the limits of a range of such bit positions. FIG. 15 shows a schematic block diagram of apparatus having all the characteristics described above.

In FIG. 15 the store 150 has addressing logic 151 similar to that described with reference to FIG. 14. The store output passes through a read/write multiplexer 152 and then through a series of multiplexers 153, comprising up to eight 8-way multiplexers if all possible skew patterns are to be allowed for. The multiplexers are controlled by a read-only memory 154 to which are applied the address bits AD0, AD1, AD2 (in the case of an eight-word store), control inputs R/W and H/V and inputs SP by means of which the necessary skew patterns may be defined. Such a multiplexer allows for a very wide variety of skew patterns. As well as the basic end-around shifts, which may be performed by the multiplexers of FIG. 1B, it is possible interchange the bits of an information item in any desired manner. Bits may be interposed and arranged as required, only those bits requiring to be searched need be in unique positions in each word location. The enable inputs of the store are controlled by another read-only memory 155 to which are applied the same address bits and control inputs as are applied to memory 154, and also inputs SL determining the pattern of bit positions to be enabled.

In order to provide a complete illustrative embodiment of this invention, the data processing apparatus as shown in FIG. 3 may be made up using known circuit elements readily available from certain integrated circuit manufacturers. For example, register 40 may be made up from three Signetics N74174 registers. The encoder and shift network 30 may be made up using a Signetics N74154 coder followed by a pair of back-to-back Signetics 8243 scalers to give the necessary end-around shift. The writable storage 20 may be, for example, a series of Fairchild 93415 TTL isoplanar 1024 word by 1-bit memories. Address identifier circuit 46, as described in the specification is required to de-skew the store addresses and then gate the result with the store output, and this may be done by a pair of Signetics 8243 scalers followed by conventional AND gating. The de-skewing and decoding circuit 51 may comprise a further pair of Signetics 8243 scalers followed by a pair of Mullard FJB9318 priority encoders to perform the decoding function.

The embodiment of FIG. 1B includes storage which may be of the same type, namely a number of the Fairchild 93415 memories. Each of the multiplexers 112 to 115 may be a Signetics S74157, or alternatively the multiplexer 112 may be of this type whilst the three multiplexers 113 to 115 are provided by a single Signetics 8243 scaler. ROM 116 may be of any suitable type, such as the Signetics 8223, whilst the addressing logic 111, as described in more detail with reference to FIG. 14, may comprise three of these 8223 ROM's.

All the Signetics data is available in the 1974 edition of the "Signetics Data Book", whilst data relating to the Mullard FJB9318 is available in the 1972 edition of "Mullard preformed MSI range of TTL integrated circuits—the FJB9300 Range". The Fairchild store data is to be found in the "Fairchild Semiconductor TTL Data Book" of June 1972.

Numerous changes may be made in the apparatus and the different embodiments of the invention without departing from the spirit thereof. Therefore it is intended that all matter contained in the foregoing description and the accompanying drawings shall be interpreted as illustrative and not in a limiting sense.

What is claimed:

1. Data processing apparatus for processing a plurality of information items, said data processing apparatus comprising:

(a) store means including a plurality of multi-bit word locations;

(b) address means for addressing selected word locations of said store means to enable respectively a reading and writing of information items from and into selected word locations of said store means; and (c) translating means coupled to said store means for successively imparting to at least a portion of each of said plurality of information items a shift whereby said portion of each of the plurality of information bits is stored into a separate multi-bit word location as determined by said address means in a manner that one of said stored information items has a sequence of bits arranged in an order different from that order of any other stored information item, and for reading out from said store means a single bit of each of said plurality of information items stored in said plurality of corresponding word locations as addressed by said addressing means and for applying a shift to the single bits, the significance of said single bit being the same in each of said stored information items.

2. Apparatus as claimed in claim 1, wherein there is further included encoder means for encoding and applying at least said portion of each of said plurality of information items to said store means.

3. Apparatus as claimed in claim 1, wherein there is further included a comparator means coupled to said store means for comparing a read-out single bit of one information item with a read-out single bit from a different information item.

4. Apparatus as claimed in claim 1, wherein each of said multi-bit word locations comprise a given number of bit positions, the number of said plurality of multi-bit word locations of said store means being equal to or less than said number of bit positions.

5. Apparatus according to claim 1, wherein said translating means is operable for writing simultaneously bits of a plurality of the information items into at least one unique bit position in each of said plurality of word locations.

6. Apparatus as claimed in claim 1, wherein said translating means is operable for reading at least one selected bit position from each of said plurality of word locations simultaneously and for arranging the bits of data read out in an order indicative of the word location from which each bit was read out.

7. Apparatus as claimed in claim 1, wherein said translating means includes shift means for successively applying each information item with an end-around shift of a predetermined number of bits and in a predetermined direction relative to that imparted to the preceding information item.

8. Apparatus as claimed in claim 1, wherein said translating means reads an information item from a selected single word location of said store means and arranges the bits of said read information item in their original order as stored within said selected word location.

9. Apparatus as claimed in claim 1, wherein said translating means comprises at least one multiplexer for receiving each of said plurality of information items, and a read-only-memory coupled to said multiplexer for controlling the shifts imparted by said multiplexer in the course of the reading and writing operations of said apparatus.

10. Apparatus as claimed in claim 1, wherein said translating means further include means for arranging one of said single bits as read out from said store means in an order indicative of the word location from which said one bit was read from said store means.

11. Data processing apparatus for processing a plurality of information items, said data processing apparatus comprising:
   (a) store means operable in a write mode for receiving and storing at least a portion of each of the plurality of information items into a plurality of corresponding multi-bit word locations and in a read mode, for reading out information items from said plurality of word locations;
   (b) address means for addressing selected word locations of said memory in both the write and read modes of operation;
   (c) loading means including means for receiving and encoding said portion of each of said plurality of information items, and means for successively imparting to said encoded portion of each of said plurality of information items a shift of a predetermined number of bits in a predetermined direction, whereby said encoded portion of each of said plurality of information items is stored into a separate multi-bit word location as determined by said address means in a manner that one of said stored information items has a sequence of bits arranged in an order different from that order of any other stored information item;
   (d) translating means for reading out simultaneously from said store means a single bit of each of said plurality of information items stored in said plurality of corresponding word locations and applying a shift of said predetermined number of bits to said single bits in a direction reversed to said predetermined direction; and
   (e) comparator means for comparing one of said read-out single bits with another selected bit from a different information item;

in which said loading means is arranged to apply a unidirectional end-around shift to each encoded portion of an information item relative to the previous stored position of an information item.

12. Apparatus as claimed in claim 11, in which said store means comprises a first part in which may be stored the encoded portion of each information item and a second part in which may be stored the remainder of each information item.

13. Apparatus as claimed in claim 12, in which said first part of said store means is divided into a number of square sub-array portions.

14. Apparatus as claimed in claim 13, in which said loading means is arranged to apply a unidirectional end-around shift of complete sub-array portions of said first part of said store means.

15. Apparatus as claimed in claim 11, in which said loading means is arranged to encode said part of each information item in a one-out-of-n code.

16. Apparatus as claimed in claim 11, wherein said translating means is arranged to read from said store means the entire encoded portion of an information item.

17. Apparatus as claimed in claim 16, in which said translating means includes shift means arranged to apply to each item read out a unidirectional end-around shift of the same magnitude and of opposite sense to that applied by said loading means.

18. Apparatus as claimed in claim 15, in which said translating means includes decoder means for decoding the encoded portion of the information item read out from said store means.

* * * * *